Figure 4:
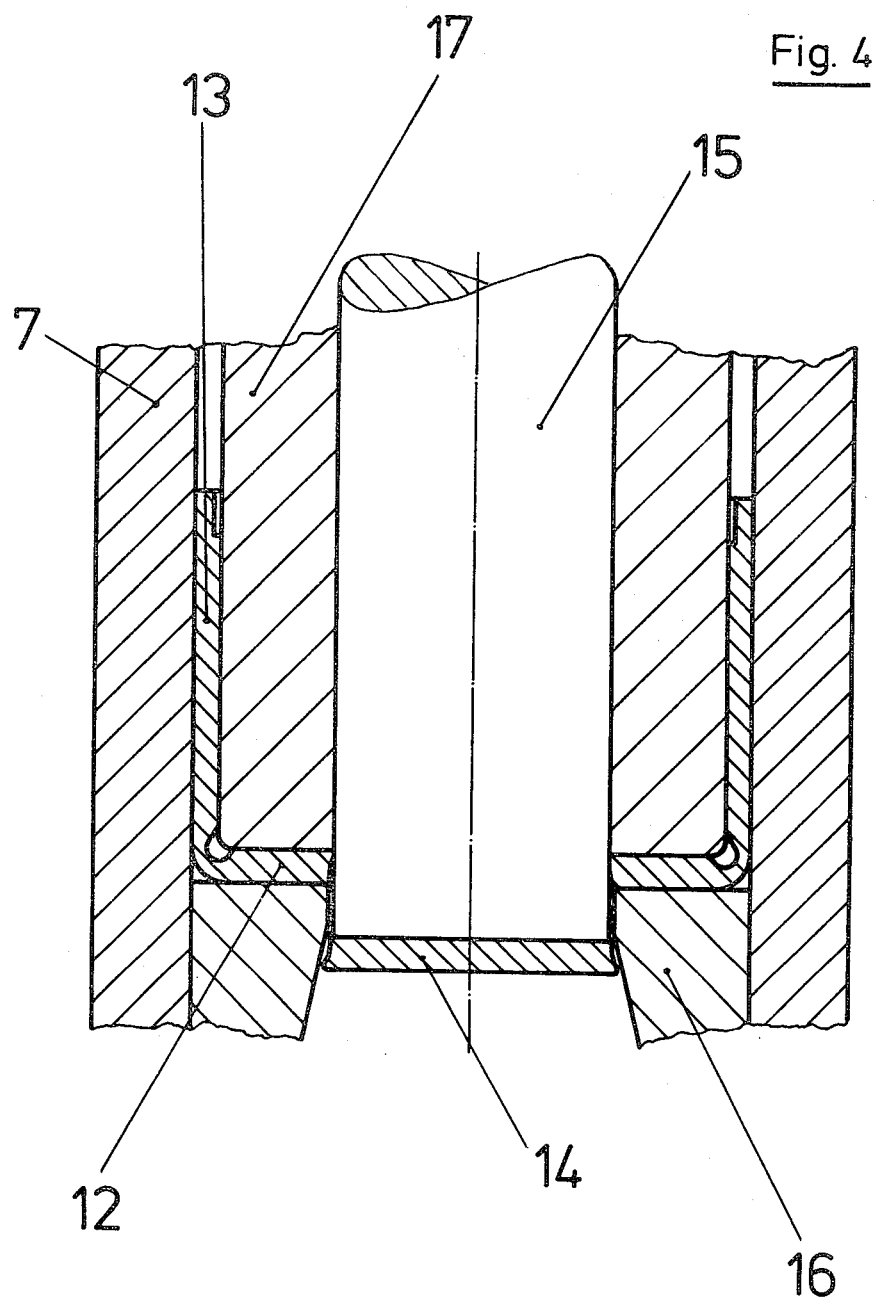

U.S. Patent [19] [11] 4,437,214

Olschewski et al. [45] Mar. 20, 1984

[54] NON-MACHINING METHOD OF MANUFACTURING A SOLID-BOTTOMED OR INTERNALLY FLANGED BEARING RACE

[75] Inventors: Armin Olschewski, Schweinfurt; Manfred Brandenstein, Eussenheim; Lothar Walter, Schweinfurt; Peter Horling, Mainberg; Hermann Hetterich, Heidenfeld; Heinrich Kunkel, Schweinfurt, all of Fed. Rep. of Germany

[73] Assignee: SKF Kugellagerfabriken GmbH, Schweinfurt, Fed. Rep. of Germany

[21] Appl. No.: 343,873

[22] Filed: Jan. 29, 1982

[30] Foreign Application Priority Data

Jan. 31, 1981 [DE] Fed. Rep. of Germany ....... 3103343

[51] Int. Cl.³ .............................................. B21K 1/04
[52] U.S. Cl. ........................ 29/149.5 DP; 29/148.4 R
[58] Field of Search ................... 29/148.4 R, 149.5 R, 29/148.4 C, 149.5 DP

[56] References Cited

U.S. PATENT DOCUMENTS 1,868,655 7/1932 Blomstrom .................. 29/149.5 DP

FOREIGN PATENT DOCUMENTS 55-2855 1/1980 Japan .......................... 29/149.5 DP
2079872 1/1982 United Kingdom ........ 29/149.5 DP

*Primary Examiner*—Howard N. Goldberg
*Assistant Examiner*—V. K. Rising
*Attorney, Agent, or Firm*—Daniel M. Rosen

[57] ABSTRACT

In a non-machining method for manufacturing a solid-bottomed or internally flanged bearing race, especially for rolling contact bearings, the starting material is in the form of a band. For the economical manufacture of this bearing race with an annular groove of extremely precise cross-sectional shape which reduces the wall thickness of the bearing race, and which is situated at the transition from the bottom or flange portion to the race portion, a flat roundel is first stamped from the band. Then a concentric annular groove is worked into one of the planar surfaces of the roundel, while the opposite planar surface thereof is supported on a planar supporting surface. Lastly, the roundel is deep-drawn in a die to form a bearing race having a solid bottom. The end face of the drawing punch concentrically engages the roundel's planar surface that is encompassed by the annular groove. This end face has a diameter that is equal to or greater than the diameter of the radially inner edge of the annular grooves and smaller than the diameter of the radially outer edge of the annular groove.

8 Claims, 7 Drawing Figures

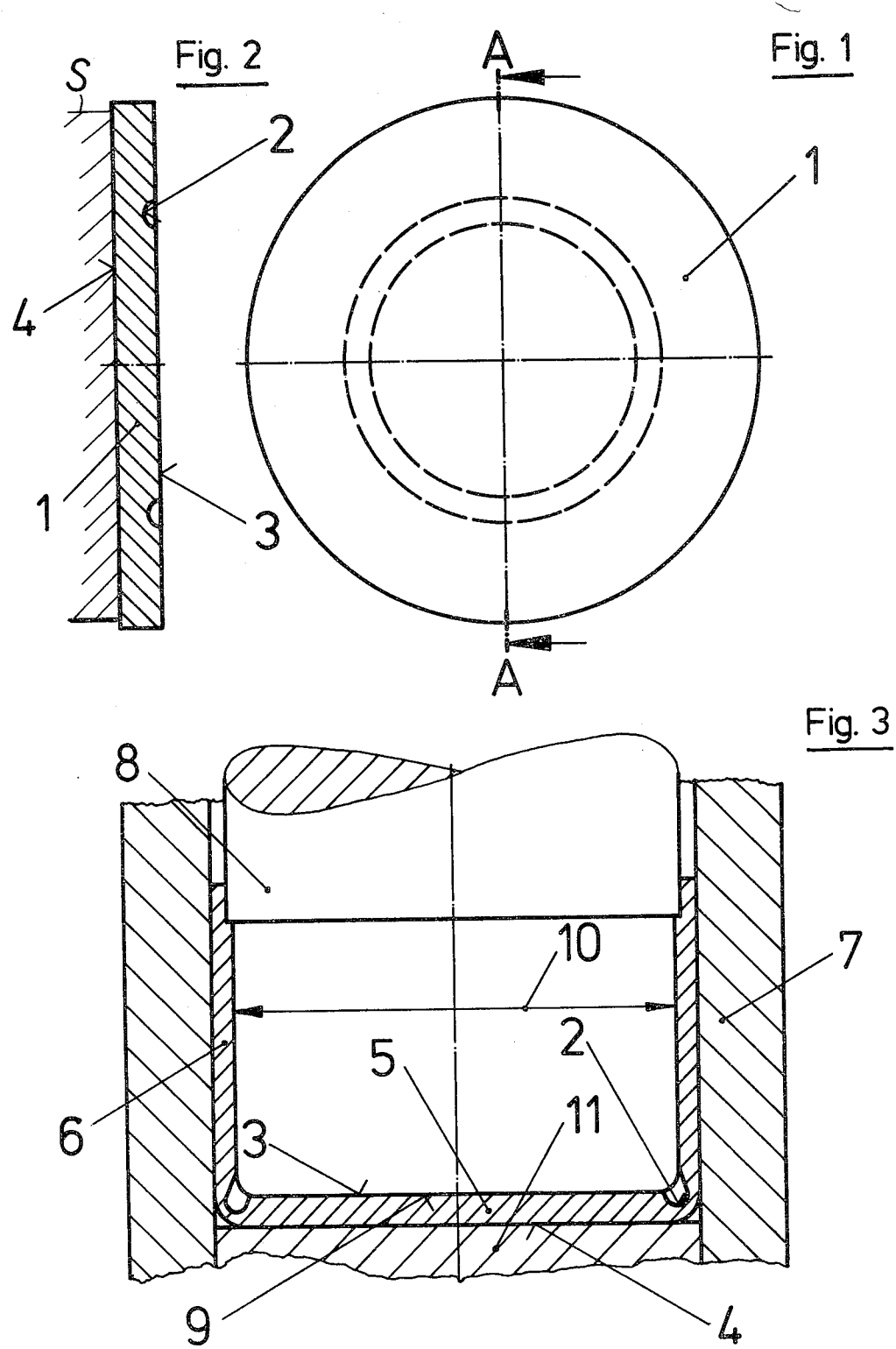

NON-MACHINING METHOD OF MANUFACTURING A SOLID-BOTTOMED OR INTERNALLY FLANGED BEARING RACE

This invention relates to methods of non-machining manufacture of bearing races or bearing sleeves provided with a floor or bottom section, in which concentric annular grooves are created in the race section or in the bottom section of the bearing race. An example of a known method will be found in German OS 2,319,484. In such known methods, the bearing race is made by deep-drawing from a flat roundel, so that the latter has an unreduced wall thickness at the transition between the bottom section and the race section. In many cases such as for example in the case of bearing races having cylindrical rollers or needles guided at their ends on the bottom section or flange, a groove of relatively small cross sectional radius must be provided at the transition. In known methods, difficulties are often encountered if relatively high axial forces must be applied to the drawing punch and die, as for example when a groove of relatively small cross-sectional radius is to be made. This is because high axial forces cause severe wear on the deep drawing punch and die. Furthermore, making the bearing sleeve by such known methods is often expensive due to high tool wear, particularly when bearing races have to be made with a larger wall thickness.

A bearing race is known which is provided with an internal flange, and in which an annular groove increasing the diameter of the bore is machined at the transition (groove) between the internal flange and the race section, using an internal boring tool or the like (German GM 1,973,726). Since the wall thickness of the bearing race is substantially reduced by the annular groove, this transition must have an extremely high accuracy of shape in order to avoid irregular concentrations of tensions at the circumference. The necessary accuracy of shape, however, cannot be produced with an internal tool or the like, because unavoidable out-of-roundness and eccentricities of the internal tool in the female die cause relatively great wall thickness variations in the bottom of the annular groove. Since severe stress is sustained by the bearing race in operation, e.g., due to axial shock loads, the life of this known bearing race is too short for a great number of applications.

It is therefore the object of the invention to provide a novel and unique method of manufacturing of a bearing race which does not require machining. It is a further object of the invention to create, by non-machining methods, a bearing race having a bottom or flange, for rolling contact bearings, with an annular groove diminishing the wall thickness at the juncture between the bottom or flange and the race section.

It is another object of the invention to manufacture such a bearing race with extremely high shape precision and low eccentricity, so that the bearing race will have a long life.

In accordance with the foregoing objects, the present invention provides for a concentric annular groove to be formed in the planar roundel with an extremely precise cross-sectional configuration, for example by a simple pressing or stamping procedure. At the same time the material, steel for example, is compressed and strengthened in the bottom of the annular groove. In particular, it is possible by controlling the magnitude of the movement of the pressing or stamping tool creating the annular groove to precisely control the wall thickness beneath the annular groove, so that there will be no undesirable variations of thickness in the bottom of the groove. When the roundel is deep-drawn in a die to form a bearing race having a solid bottom, the shape and cross-section of the annular groove are modified uniformly around the circumference since the drawing die engages only the planar surface of the roundel encompassed by the annular groove. The drawing forces forming the race portion act uniformly on the circumference of the annular groove. The bearing race will have sufficiently high strength, even when mounted, for example, on the pivots of a spider in a universal joint and the full bottom or flange of the bearing race is subjected in operation to axial shock loads transmitted to the bottom or flange by the end face of the pivot and/or by end faces of the cylindrical rollers or needles installed in the race. The bearing race can be manufactured economically in large quantity in only a few steps in a gang press, using simple punching, pressing and drawing tools. The tools need to withstand no more than relatively small working stresses, even in the case of thick-walled bearing races, and accordingly will have a long and useful life.

If, after the deep-drawn bearing race has been hardened, the race is found to have undergone great hardening distortion, the diameter of the bore of the race can be corrected by fine grinding. This is because the larger-diameter annular groove at the bottom or flange end of the bore surface uniquely provides the condition required for letting the grinding wheel "spark out" into the annular groove. Likewise, the planar surface of the flat bottom or flange of the bearing race, which is encompassed by the annular groove, can be finish ground, if necessary, after the bearing race has been hardened.

Advantageous additional features of the invention are attained within the scope of the invention method.

By providing the annular groove with a cross-section in the shape of a segment of a circle, it is possible for the required forming tool for the annular groove to be made particularly simple, and, as a result of such simplicity in shape, to be rebuilt economically after it has become worn out. By this forming step, an annular groove is created at the transition between the bottom or flange and the race itself which, due to its rounded cross-sectional shape, acts as a relief groove and thus helps accommodate any dangerous notch stresses at this transition.

In addition, by providing the annular groove with a substantially semi-elliptical cross-section the drawing forces pressing the circumference when the roundel is deep drawn are introduced gradually into the highly stressed area beneath the annular groove, so that no harmful crazing will develop in the material of the bearing race in the deep drawing process. By providing the annular groove with an outwardly flaring level on its radially inner side, after the deep drawing of the roundel, the annular groove will have an approximately circular cross-section. The corresponding annular groove serves especially as a relieving means to accomodate peak tensions. Furthermore, it is possible in this manner to provide a margin on the inner face of the bottom of the bearing race which will extend relatively far outward radially. As a result, in the case of a bearing race having cylindrical rolling bodies installed in it, the ends of the bearing bodies will be supported on a relatively large surface area on the internal face of the bottom or flange. The rolling bodies are therefore capable of transmitting heavy axial forces without overloading due to excessively great thrusts against the bottom or flange of the bearing race.

The method of the present invention allows for a simple and economical configuration of the tools for the manufacture of the bearing race as provided by the use of stamping, drawing and use of a drawing punch. By the method of the invention, it is also possible to economically produce a bearing race having a flange.

The method of the invention for the non-machining manufacture of a bearing race provided with a bottom or flange will be further explained in the following more detailed description, taken in conjunction with the appended drawings, wherein:

FIG. 1, shows a roundel punched from a material in band form, after the stamping or rolling of a concentric annular groove, FIG. 2, shows a cross-section along line A—A through the roundel represented in FIG. 1.

Figure 5:
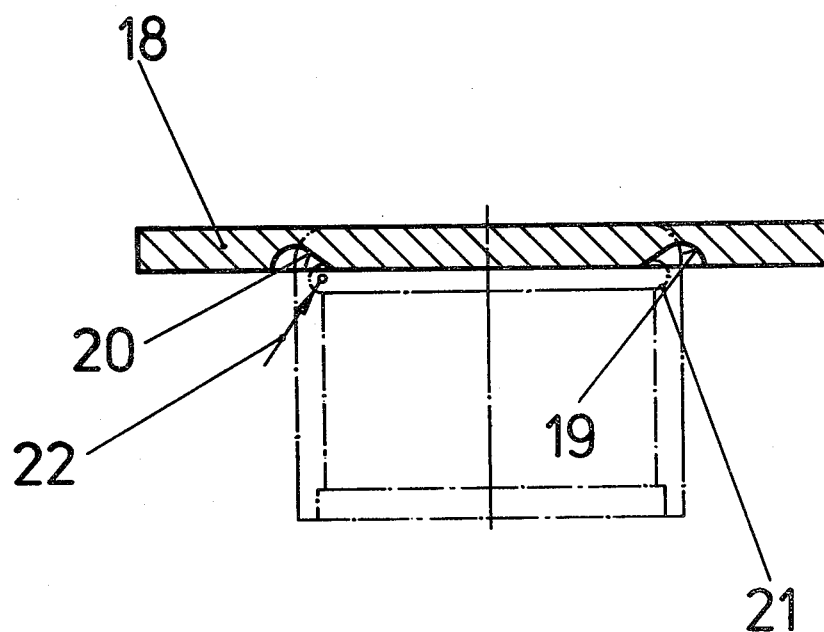
Figure 6:
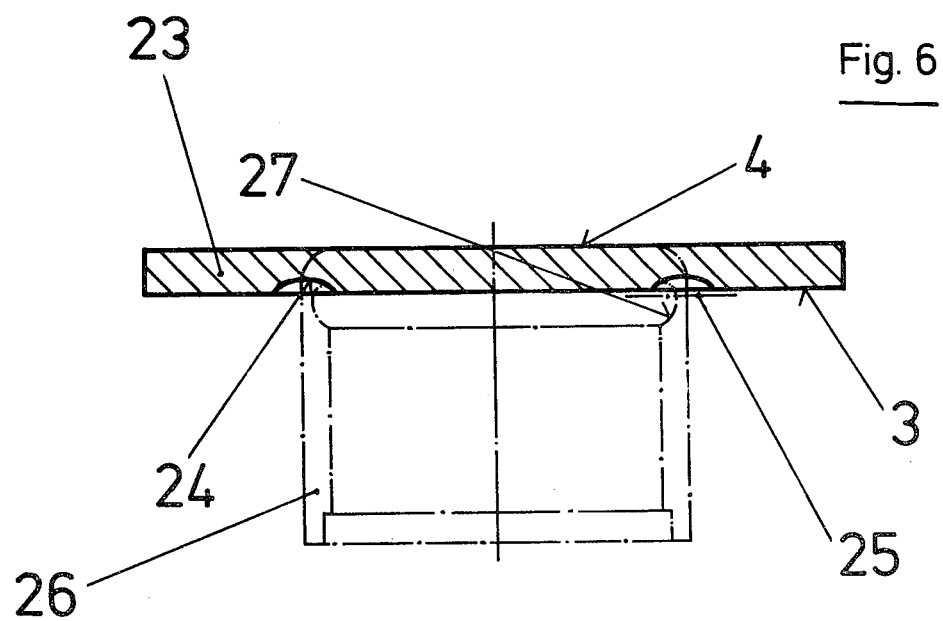
Figure 7:
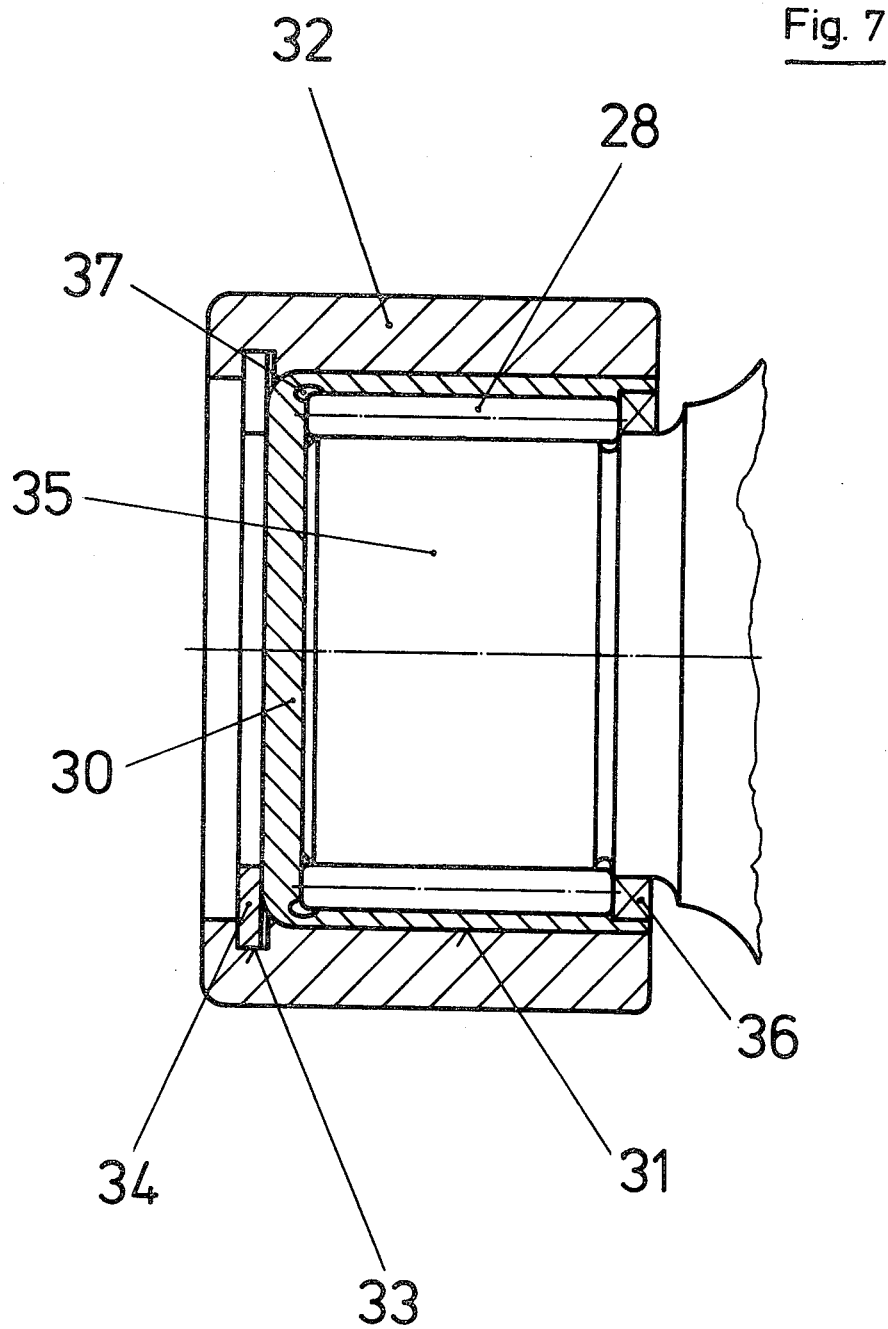

FIG. 3, shows the roundel of FIGS. 1 and 2 after deep drawing in a die to a bearing race having a solid bottom, FIG. 4, shows the bearing race of FIG. 3 during the stamping of a central portion from the bottom for the purpose of making a bearing race having a flange, FIG. 5, and 6 each show a variant roundel punched from material in band form, after a concentric annular groove has been stamped or rolled into the roundel, and FIG. 7, is a longitudinal section through a roller bearing having a solid bottom, installed on the one side of the yoke of a universal joint.

FIGS. 1 and 2 show a flat roundel 1, which has been punched out of material in band form, e.g., steel, and has then been provided with a concentric annular groove in the planar surface 3 opposite planar surface 4. The annular groove 2, which in the present case has a segment-shaped cross-section, is produced by known non-machining methods, such as stamping or rolling, in the planar surface 3, the opposite planar surface 4 being supported on a flat supporting surface.

For the non-machining manufacture of a bearing race 6 provided with a solid bottom 5, the roundel 1 represented in FIGS. 1 and 2 is deep-drawn in a die (see FIG. 3). The drawing punch 8 is disposed concentrically in the drawing die 7 so that the latter concentrically engages with its end face 9, which in the present case is of a planar configuration, the planar surface 3 contained within the annular groove 2 of the roundel 1. The drawing punch 8 furthermore has a cylindrical surface and has at its end face 9, the diameter 10 of which is equal to or greater than the diameter of the radially interior edge of the annular groove 2, and is smaller than the diameter of the radially exterior edge of the annular groove 2. During the deep drawing in the die 7, the roundel 1 is gripped by the counter-punch 11 thrusting against the planar surface 4.

As shown in FIG. 4, for the non-machining manufacture of a bearing race 13 provided with a flange 12, a central section 14 of the bottom 5 is subsequently punched out. This punching out of the central section 14 is performed with the punch 15 in the same die 7 used for the drawing of the bearing race 6, while support is provided by the punching die 16 bearing against the solid bottom 12 of the bearing race 13. The punch 15 is guided in the guide of the bearing race 13. The drawing of the bearing race and the punching of the central section 14 is economically performed in a gang press.

FIG. 5 represents a modified roundel 18 punched from material in band form, in which the concentric annular groove has been worked into it by embossing or rolling. This annular groove 19 is here provided, on its radially inner side, with a bevel 20 flaring axially outwardly. After the roundel 19 has been deep drawn, the annular groove 19 will have a substantially circular cross section having the radius 22. The cross-section 21 of the finished drawn bearing race is represented by broken lines in FIG. 5.

FIG. 6 shows another modified roundel 23 stamped from sheet steel. This one again has a concentrically rolled or stamped annular groove 24. In the present case the annular groove 24, however, has a substantially semielliptical cross-section. The large axis 25 of the ellipse of the cross-section is approximately parallel to the planar surfaces 3 and 4 of the roundel 23. When the roundel 23 is deep drawn, a bearing race 26 is formed which has a solid bottom. The cross-section of the annular groove 27 of this bearing race 26 extends to a great extent into part of the bore in the sleeve part of the bearing race 26.

The bearing race made by non-machining methods by the process of the invention and provided with a solid bottom or flange can be used, for example, as represented in FIG. 7, as a needle bearing having cylindrical needles 28. The needles run on the surface of the bore of the cylindrical section 29 of the bearing race provided with a solid bottom 30. This needle bearing is installed in the cylindrical bore in the eye 32 of the yoke of a universal joint (not shown). By means of the snap ring 34 set in the bore of the yoke eye 32, the needle bearing is supported on the outer side of the eye 32 and fixed axially in the bore thereof. The pivot 35 of a universal-joint spider (not shown), which is known in itself, is mounted in the needle bearing. On the inside of the eye 32 a grease seal 36 is installed on the pivot 35, within the bore of the bearing race 31.

At the transition (groove) between the bottom 30 and the race portion 29, the annular groove 37 is made by a noncutting method which reduces the wall thickness of the bearing race 31.

Although high axial forces are transmitted in operation between the pivot 35 and/or the needles 28 and the bottom 30, and the bearing race 31 accordingly is subject to high material stresses (bending stresses) at the point where it is thinned by the annular groove 37, the bearing race 31 has sufficient long-term strength because the material of the race has been compressed and strengthened at the bottom of the annular groove 37 by the rolling or stamping operation, and also because the cross-sectional shape of the annular groove 37 on the circumference is extremely precise.

The above-described method for the non-machining manufacture of a bearing race provided with a solid bottom or an internal flange can be modified within the scope of the invention. For example, the bottom or the internal flange of the bearing race does not have to be made with a drawing punch that has a flat end face 7. Instead, when the roundel is deepdrawn, a punch can be used whose end surface is cupped or domed or conical. Likewise, the circumference of the drawing punch does not need to be of cylindrical shape. That is to say, the circumference of the punch can also have a shape that tapers toward the bottom or flange, as the case may be, of the bearing race, for the purpose of manufacturing tapered friction or rolling surfaces in the bore. Other variations within the scope of the invention will be apparent to those skilled in the art.

What is claimed is:

1. A method for the non-machining manufacturing a bearing race comprising the steps of: punching a flat roundel from band material, forming by non-machine working a concentric annular groove into one of the two planar surfaces of the roundel, the opposite planar surface of the roundel being supported on a flat supporting surface and deep drawing the roundel into a bearing race having a floor section, in a die, with a punch concentrically engaging with its end face that portion of the roundel's planar surface encompassed by the annular groove, said punch having a punch diameter at its end face equal to or larger than the diameter of the radially inner edge and smaller than the diameter of the radially outer edge of the annular groove.

2. The method of claim 1 wherein the annular groove is provided, in the non-machining forming operation, with a cross-section in the shape of a segment of a circle.

3. The method of claim 1, wherein the annular groove is provided, in the non-machining forming operation, with a substantially semi-elliptical cross-section, the large axis of the ellipse being approximately parallel to the planar surfaces of the roundel.

4. The method of claims 1, 2 or 3, wherein the annular groove is provided, in the non-machining forming operation, with an outwardly flaring bevel on its radially inner side.

5. The method of claim 1, 2 or 3, wherein the non-machining forming of the annular groove is accomplished by stamping.

6. The method of claim 1, 2 or 3 wherein the non-machining forming of the annular groove is accomplished by rolling.

7. The method of claim 1, 2 or 3 wherein the deep drawing is performed with a drawing punch of flat configuration on its end face.

8. The method of claim 1, 2 or 3 wherein said bearing race is provided with a rim section, the center section of the floor section being punched out after the deep drawing of the roundel.

* * * * *